United States Patent
Ren et al.

(10) Patent No.: US 8,911,810 B2
(45) Date of Patent: Dec. 16, 2014

(54) METHOD FOR PRODUCING ORGANIC FERTILIZER AND ORGANIC FEED

(75) Inventors: Huifeng Ren, Minato-ku (JP); Ryoji Fukuda, Hiroshima (JP)

(73) Assignee: Taisei Nozai Co., Ltd., Hiroshima (JP)

( * ) Notice: Subject to any disclaimer, the term of this patent is extended or adjusted under 35 U.S.C. 154(b) by 244 days.

(21) Appl. No.: 13/388,709

(22) PCT Filed: Aug. 18, 2009

(86) PCT No.: PCT/JP2009/064423
§ 371 (c)(1),
(2), (4) Date: Feb. 3, 2012

(87) PCT Pub. No.: WO2011/021269
PCT Pub. Date: Feb. 24, 2011

(65) Prior Publication Data
US 2012/0128846 A1 May 24, 2012

(51) Int. Cl.
*A23K 1/10* (2006.01)
*C05F 1/00* (2006.01)

(52) U.S. Cl.
CPC .............. *C05F 1/002* (2013.01); *A23K 1/103* (2013.01)
USPC .............................. 426/429; 71/16; 426/424

(58) Field of Classification Search
CPC ......... A23K 1/00; A23K 1/103; A23K 1/106; B09B 3/0016; C05F 1/00; C05F 1/002
USPC .............................. 71/16; 426/429, 478, 495
See application file for complete search history.

(56) References Cited

FOREIGN PATENT DOCUMENTS

| JP | 9-028308 | 2/1997 |
|---|---|---|
| JP | 2000-217503 | 8/2000 |
| JP | 2005087931 A * | 4/2005 |
| JP | 2006-042613 | 2/2006 |
| JP | 2007-135491 | 6/2007 |
| WO | WO-2007/108286 | 9/2007 |

OTHER PUBLICATIONS

Wakasugi et al., JP 2005 087931; English translation; Published on Apr. 7, 2005.*
Kanayama et al., JP 2007 135491 English translation, Published on Jun. 7, 2007.*

* cited by examiner

*Primary Examiner* — Humera Sheikh
*Assistant Examiner* — Walter Moore
(74) *Attorney, Agent, or Firm* — Jordan and Hamburg LLP (57) ABSTRACT

An organic fertilizer and an organic feed are produced by removing cadmium from processing residues of scallop (*Patinopecten yessoensis*) without separating the midgut gland. That is, a small amount of an aqueous citric acid solution is added to the processing residues of scallop including the midgut gland in which cadmium has been accumulated at a high concentration and the mixture of them is heated to 55 to 65° C. Thus, the thin midgut gland membrane is broken and the internal solution of the midgut gland containing cadmium is eluted. Then, solid matters are separated from the mixture including the solid matters and the internal solution of the midgut gland eluted. As the aqueous citric acid solution, a solution prepared by mixing at least 9% by weight of water relative to the processing residues and 1.8 to 3.3% by weight of citric acid relative to the total weight of the processing residues and water is used. The content of cadmium in the solid matters can be further reduced by adding water to the solid matters having been separated and then heating the mixture of them to 55 to 65° C., thereby washing off cadmium remaining in the solid matters.

8 Claims, 4 Drawing Sheets

| CITRIC ACID CONCENTRATION (WT%) | CONTENT OF CADMIUM (ppm/1% NITROGEN) |
|---|---|
| 1 | 1.09 |
| 2 | 0.61 |
| 3 | 0.67 |

(B)

| AMOUNT OF WATER / CITRIC ACID CONCENTRATION (WT%) | CONTENT OF CADMIUM (ppm/1% NITROGEN) | |
|---|---|---|
| | 1-FOLD AMOUNT | 2-FOLD AMOUNT |
| 1 | 0.80 | 0.37 |
| 2 | 0.41 | 0.28 |
| 3 | 0.34 | 0.26 |

(C)

| AMOUNT OF WATER / CITRIC ACID CONCENTRATION (WT%) | CONTENT OF CADMIUM (ppm/1% NITROGEN) | |
|---|---|---|
| | 1-FOLD AMOUNT | 2-FOLD AMOUNT |
| 1 | 0.25 | 0.21 |
| 2 | 0.19 | 0.18 |
| 3 | 0.15 | 0.19 |
| TOTAL AMOUNT OF WATER (RELATIVE TO THE WEIGHT OF STARTING PROCESSING RESIDUES) | 1.3-FOLD AMOUNT | 1.8-FOLD AMOUNT |

| AMOUNT OF WATER (WEIGHT RATIO OF WATER TO STARTING PROCESSING RESIDUES OR SEPARATED SOLID MATTERS) | CONTENT OF CADMIUM (ppm/1% NITROGEN) |
|---|---|
| (FIRST TIME) ONE-TENTH OF THE WEIGHT OF THE STARTING PROCESSING RESIDUES | 1.69 |
| (SECOND TIME) ONE-SIXTH OF THE WEIGHT OF THE SEPARATED SOLID MATTERS | 1.47 |
| (THIRD TIME) ONE-SIXTH OF THE WEIGHT OF THE SEPARATED SOLID MATTERS | 0.88 |

(B)

| AMOUNT OF WEAK ACID | NUMBER OF TIMES OF WASHING | CONTENT OF CADMIUM BEFORE DRYING (ppm/1% NITROGEN) | AFTER DRYING (ppm) |
|---|---|---|---|
| ACETIC ACID SOLUTION CONCENTRATION: 1 WT% AMOUNT OF AQUEOUS SOLUTION: 2 TIMES | FIRST TIME | 0.35 | 4.34 |
| | SECOND TIME | 0.23 | 2.83 |
| ACETIC ACID SOLUTION CONCENTRATION: 2 WT% AMOUNT OF AQUEOUS SOLUTION: 2 TIMES | FIRST TIME | 0.34 | 4.04 |
| | SECOND TIME | 0.15 | 1.86 |
| AQUEOUS CITRIC ACID SOLUTION CONCENTRATION: 1 WT% AMOUNT OF AQUEOUS SOLUTION: 2 TIMES | FIRST TIME | 0.33 | 3.89 |
| | SECOND TIME | 0.13 | 1.48 |
| AQUEOUS CITRIC ACID SOLUTION CONCENTRATION: 2 WT% AMOUNT OF AQUEOUS SOLUTION: 2 TIMES | FIRST TIME | 0.33 | 3.76 |
| | SECOND TIME | 0.09 | 1.03 |

METHOD FOR PRODUCING ORGANIC FERTILIZER AND ORGANIC FEED

BACKGROUND OF THE INVENTION

The present invention relates to a method of producing an organic fertilizer and an organic feed by removing cadmium form processing residues of scallop, particularly to a method of producing an organic fertilizer and an organic feed by removing cadmium form processing residues of scallop in the condition of containing midgut gland where cadmium has been accumulated.

Over 500,000 tons of scallops are produced each year and they are important resources as food which account for approximately 10% of the total fish catch in Japan. The adductor muscle of a scallop which is a main edible part is only 15% weight of the whole scallop. The remaining shells (50% weight) and soft body part (35% weight) are discarded as processing waste. A large amount of useful ingredients such as protein and amino acid is contained in the soft body part and it is desirable that the useful ingredients are reused as fertilizers or feeds.

Hence, because of the biological concentration of up to 100 mg/kg of cadmium (Cd) in the midgut gland contained in the soft body part, the midgut gland cannot be reused as a fertilizer or a feed, and cannot be discarded as processing waste. Then, the present inventors have proposed means for removing the midgut gland from the soft body part, separating cadmium contained in the midgut gland, and reusing final residues of the midgut gland from which the cadmium is removed as organic fertilizers (see Patent Literature 1).

In the means described in Patent Literature 1, the midgut gland of scallop is removed from the soft body part, the midgut gland is ground with a mixer, 2% acetic acid solution in an amount equivalent to that of the midgut gland is added, the mixture is heated to 80° C. and stirred for 10 minutes, and the mixture is separated into solid residues and a cleaning liquid by centrifugation. Subsequently, 2% acetic acid solution of 2 times weight relative to the solid residues is added to the separated solid residues of the midgut gland, the mixture is heated to 80° C. and stirred for 10 minutes, and the mixture is separated into solid residues of the midgut gland and a cleaning liquid by centrifugation. Subsequently, the washing and separation operation is repeated twice. Then, final solid residues of the midgut gland thus washed are reused as organic fertilizers. The formed cleaning liquids are gathered and cadmium is separated and removed therefrom, and then the resultant solution is reused as a liquid organic fertilizer.

PATENT LITERATURE

Patent Literature 1: PCT International publication No. WO 2007/108286

SUMMARY OF THE INVENTION

Hence, the subsequent investigation has revealed the following fact. The operation of removing the midgut gland from the soft body part is laborious. Accordingly, at the actual processing site, some useful portions such as adductor muscle and mantle are removed from the soft body part and then all the remaining portions are disposed as waste without removing the midgut gland. That is, it is found that the soft body part including a large amount of useful ingredients such as protein and amino acid is discarded without being reused as a fertilizer or a feed.

An object of the present invention is to provide a method of producing an organic fertilizer and an organic feed which can remove cadmium easily without removing the midgut gland after some useful portions such as adductor muscle and mantle are removed from the soft body part, using no high-tech equipment and requiring a small sum of investment for initial facilities, and therefore can be applied to small companies.

In order to solve the problems, the present inventors have been dedicated to making repetitive studies and tests and found out that when a small amount of water is added to processing residues obtained by removing some useful portions such as adductor muscle and mantle from the soft body part after removal of the shells, i.e., the processing residues containing the midgut gland and the mixture is heated to around 60° C. while stirring slowly, the midgut gland expands and a thin midgut gland membrane is broken, the internal solution of the midgut gland containing a high concentration of cadmium is eluted, portions other than the midgut gland (i.e., gonad, mantle, gill, heart, and kidney) are not broken, and they remain as solid matters. A mixture of the solid matters composed of portions other than the midgut gland and the eluted internal solution of the midgut gland can be easily separated by a simple separation means such as a sieve, so that the remaining useful portion from which the midgut gland containing a large amount of cadmium is removed can be easily obtained.

Hence, even if the internal solution of the midgut gland containing cadmium is removed by the above means, some of the eluted internal solution of the midgut gland is mixed in the remaining useful solid matters. When the remaining useful portion in which a part of the internal solution of the midgut gland is mixed is stirred in warm water, the amount of internal solution of the midgut gland which is mixed therein can be reduced. However, it is found that it is difficult to satisfy an acceptable standard value (the content of cadmium is 0.8 ppm per 1% nitrogen or less) according to the Fertilizer Control Law or an acceptable value for feed, i.e., a standard (the content of cadmium is 2.5 ppm or less in a dried product) by only washing and stirring the remaining useful portion in warm water. Then, the present inventors have found out that when the internal solution of the midgut gland is stirred in a warm aqueous solution of weak acid containing citric acid or acetic acid, cadmium contained in the internal solution of the midgut gland is liberated, the liberated cadmium is dissolved and eluted in the weak acidic aqueous solution, then the cadmium remaining in solid matters can be effectively washed off, and the content of cadmium may satisfy the acceptable standard according to the Fertilizer Control Law.

Further, the present inventors have found that when a small amount of the aqueous weak acid solution is first added to the processing residues containing the midgut gland and the mixture is heated to around 60° C. by being stirred slowly, the midgut gland expands and a thin midgut gland membrane is broken, the internal solution of the midgut gland containing cadmium is eluted, the cadmium contained in the eluted internal solution of the midgut gland is liberated, the liberated cadmium is dissolved and eluted in the aqueous weak acid solution, and thus the amount of cadmium remaining in solid matters may satisfy the acceptable standard according to the Fertilizer Control Law.

In the means above, the mixture containing the cadmium dissolved and leaked remains as a cleaning liquid. Since the cleaning liquid includes a large amount of cadmium, it is necessary to remove the cadmium separately. It is possible to use any known means described in Patent Literature 1 as a means for separating and removing cadmium from the cleaning liquid containing a large amount of cadmium. From the viewpoint of costs of facilities, reagents, and operation necessary for the removal means, it is desired that the amount of the cleaning liquid is as small as possible.

For example, when the means described in Patent Literature 1 is applied to the processing residues in which the midgut gland is not removed in place of the midgut gland element, the amount of the cleaning liquid containing cadmium that can satisfy the acceptable standard according to the Fertilizer Control Law reached at 4 times weight relative to the weight of the processing residues which are starting materials. The present inventors have found out that the amount of cleaning liquid containing cadmium can be reduced by 2 times or less of the processing residues, which are starting materials, by the new means.

The method of producing an organic fertilizer and an organic feed according to the present invention is based on the above findings. That is, the method of producing an organic fertilizer has the characteristics that include a first process of adding an aqueous citric acid solution to processing residues containing a midgut gland of scallop, heating the processing residues and the aqueous citric acid solution to 55 to 65° C., breaking a midgut gland membrane to allow an internal solution of the midgut gland containing cadmium to be eluted, and preparing a mixture containing the solid matters in the processing residues and the eluted internal solution of the midgut gland, and a second process of separating the solid matters from the mixture. It is desirable that the aqueous citric acid solution is obtained by adding a water by at least 9% weight relative to the processing residues and a citric acid by 1.8 to 3.3% weight relative to total weight of the processing residues and the water.

The method of reducing an organic fertilizer according to the present invention has other characteristics that include a first process of adding an aqueous citric acid solution to processing residues containing a midgut gland of scallop and heating the processing residues and the aqueous citric acid solution to 55 to 65° C., breaking a midgut gland membrane to allow the internal solution of the midgut gland containing cadmium to be eluted, and preparing a first mixture containing solid matters in the processing residues and the eluted internal solution of the midgut gland, a second process of separating the solid matters from the first mixture, a third process of adding a water to the separated solid matters and heating the separated solid matters and the water to 55 to 65° C., washing and removing the cadmium remaining in the solid matters with the water, and preparing a second mixture containing solid matters from which the cadmium is washed and removed and the cadmium thus washed and removed; and a fourth process of separating the solid matters from the second mixture.

It is desirable that the aqueous citric acid solution is obtained by adding a water by at least 9% weight relative to the processing residues and a citric acid by 0.9 to 3.3% weight relative to the total weight of the processing residues and the water, and the weight of water to be added to the separated solid matters in the third process is 0.9- to 2.2 times weight of the separated solid matters.

The method of producing an organic fertilizer according to the present invention has other characteristics that include a first process of adding a water to processing residues containing a midgut gland of scallop and heating the processing residues and the water to 55 to 65° C., breaking a midgut gland membrane to allow an internal solution of the midgut gland containing cadmium to be eluted, and preparing a first mixture containing solid matters in the processing residues and the eluted internal solution of the midgut gland, a second process of separating the solid matters from the first mixture, a third process of adding a warm water at 40 to 50° C. to the separated solid matters and washing and removing the internal solution of the midgut gland remaining in the solid matters with the warm water, and preparing a second mixture containing the solid matters from which the internal solution of the midgut gland is washed and removed and the internal solution of the midgut gland thus washed and removed; a fourth process of separating the solid matters from the second mixture, a fifth process of repeating the third and fourth processes once again, a sixth process of adding either aqueous citric or acetic acid solutions to the separated solid matters at the final stage of the fifth process and heating the separated solid matters and the aqueous citric or acetic acid solutions to 55 to 65° C., liberating cadmium contained in the internal solution of the midgut gland remaining in the solid matters and washing and removing the liberated cadmium, and preparing a third mixture containing solid matters from which the cadmium is washed and removed and the cadmium thus washed and removed; and a seventh process of separating the solid matters from the third mixture.

It is desirable that the weight of water to be added to the processing residues containing the midgut gland of scallop in the first process is at least 9% weight relative to the processing residues, the weight of warm water to be added to the solid matters in the third process is at least one-sixth weight of the processing residues, the weight of either aqueous citric or acetic acid solutions to be added to the solid matters in the fifth process is 1.8- to 2.2 times weight of the solid matters, and the concentration of citric acid or acetic acid in the aqueous solution is from 0.9 to 2.2% weight relative to the total weight of the solid matters and water.

The method of producing an organic feed according to the present invention has characteristics that include a first process of adding a water to processing residues containing a midgut gland of scallop and heating the processing residues and the water to 55 to 65° C., breaking a midgut gland membrane to allow a internal solution of the midgut gland containing cadmium to be eluted, and preparing a first mixture containing solid matters in the processing residues and the eluted internal solution of the midgut gland, a second process of separating the solid matters from the first mixture, a third process of adding a warm water at 40 to 50° C. to the separated solid matters and washing and removing the internal solution of the midgut gland remaining in the solid matters with the warm water, and preparing a second mixture containing the solid matters from which the internal solution of the midgut gland is washed and removed and the internal solution of the midgut gland thus washed and removed, and a fourth process of separating the solid matters from the second mixture, a fifth process of repeating the third and fourth processes once again, a sixth process of adding either aqueous citric or acetic acid solutions to the separated solid matters at the final stage of the fifth process and heating the separated solid matters and the aqueous citric or acetic acid solutions to 55 to 65° C., liberating cadmium contained in the internal solution of the midgut gland remaining in the solid matters and washing and removing the liberated cadmium, and preparing a third mixture containing the solid matters from which the cadmium is washed and removed and the cadmium thus washed and removed, a seventh process of separating the solid matters from the third mixture, and an eighth process of repeating the sixth and seventh processes once again.

It is desirable that the weight of water to be added to the processing residues containing the midgut gland of scallop in the first process is at least 9% weight relative to the processing residues, the weight of warm water to be added to the solid matters in the third process is at least one-sixth weight of the processing residues, the weight of either aqueous citric or acetic acid solutions to be added to the solid matters in the sixth process is 1.8- to 2.2 times weight of the solid matters, the concentration of the aqueous citric acid solution to be added to the solid matters in the sixth process is 0.9 to 2.2% weight relative to the total weight of the solid matters and the water, and the concentration of the aqueous acetic acid solution to be added to the solid matters in the sixth process is 1.8 to 2.2% weight relative to the total weight of the solid matters and the water.

Here, the term "processing residues of scallop containing a midgut gland" means a portion in which only the adductor muscle is removed from the soft body part after removal of the shells of the scallop or means a remaining portion from which useful portions such as an adductor muscle and a mantle are removed. Specifically, it corresponds to the midgut gland, gonad, mantle, gill, heart, and kidney. The term "internal solution of the midgut gland" means a liquid content of the midgut gland enclosed by a thin membrane. The term "solid matters" means a matter obtained by removing the midgut gland from "the processing residues of scallop".

Since cadmium can be easily removed from the processing residues of scallop without separating the midgut gland, the processing residues which have been disposed can be reused as organic fertilizers or organic feeds. Proteins contained in the separated useful solid matters are oxidized by using a weak acidic aqueous solution of citric acid or acetic acid without using strong acids such as hydrochloric acid, nitric acid, and sulfuric acid. Accordingly, the so-called "burning" cannot be caused and it is not necessary to neutralize acid.

Since the concentration of the aqueous citric or acetic acid solution to be used is as low as about 1 to 3%, it is possible to keep down the costs of citric acid or acetic acid to be used. The simple and inexpensive equipment is sufficient to be used in the process and thus the costs of the equipment, maintenance, and operation can be reduced. As further described later, the amount of the cleaning liquid containing the dissolved and eluted cadmium can be reduced, so that costs of facilities, reagents, and operation necessary for the means for removing cadmium from the cleaning liquid can be reduced.

DESCRIPTION OF THE PREFERRED EMBODIMENTS

Figure 1:
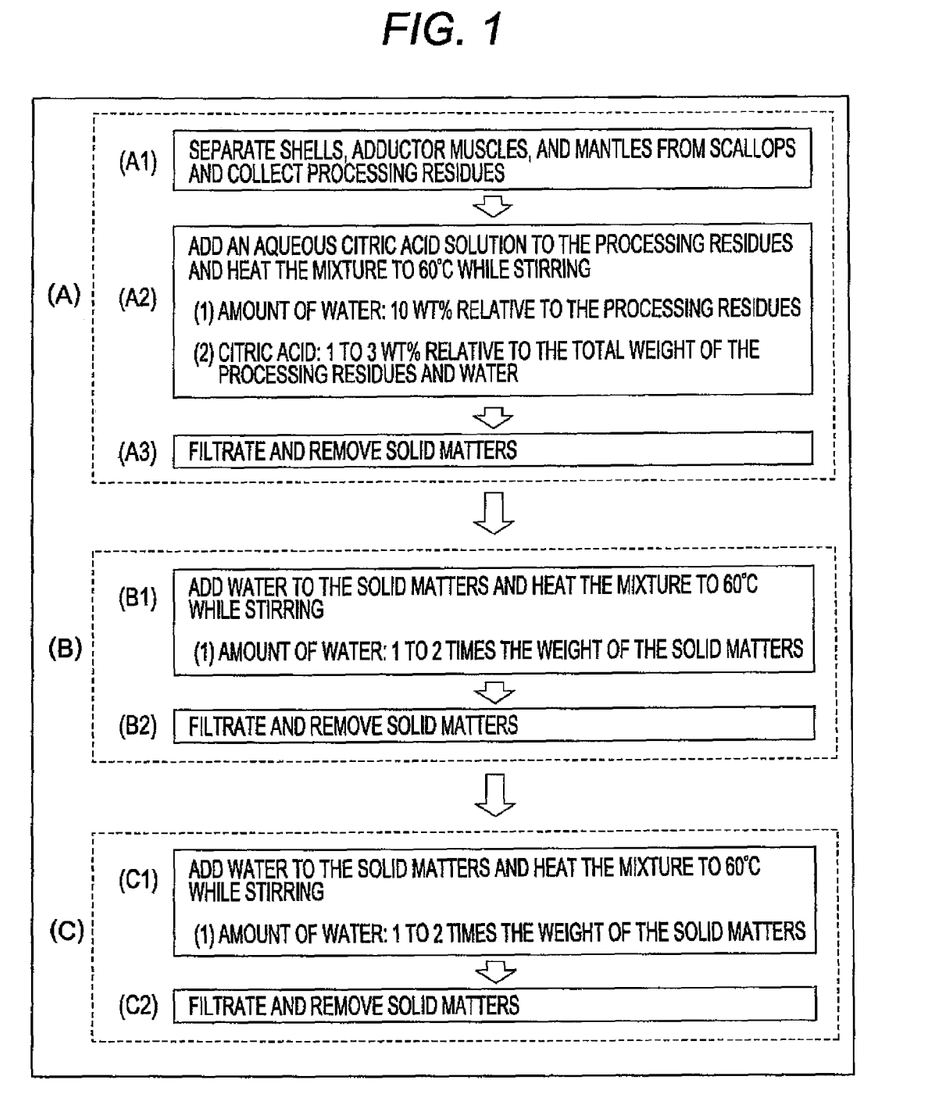
FIG. 1 is a block diagram showing a process of producing an organic fertilizer.

The method of producing an organic fertilizer and an organic feed according to the present invention will be described with reference to FIGS. 1 and 2. As shown in FIG. 1(A), remaining processing residues containing the midgut gland obtained by removing some useful portions such as shells, adductor muscles, and mantles from scallops are collected (A1). Subsequently, in a first process (A2), an aqueous citric acid solution is added to the raw processing residues collected, the raw processing residues collected are heated together with the aqueous citric acid solution while stirring slowly. As the aqueous citric acid solution, a mixture of water of which weight is at least 9% of that of the processing residues (A1) and citric acid for industrial use of which weight is 0.9 to 3.3% of those of the water and the processing residues (A1) is used.

Here, the amount of the aqueous citric acid solution may be further increased. In order to reduce the amount of the cleaning liquid containing cadmium, it is desirable that the amount is as small as possible. As an amount of an aqueous solution that can remove cadmium effectively, the amount of the aqueous solution is from 9 to 20% by weight based on the processing residues (A1). The amount of citric acid to be used may be further increased. From the viewpoint of suppressing the eluting of useful ingredients such as nitrogen and keeping costs of citric acid low, it is desirable that the amount of citric acid is as small as possible. When inexpensive citric acid for industrial use is used, an amount which can remove cadmium effectively is from 0.9 to 3.3% by weight based on the total weight of the processing residues (A1) and the water.

When the central temperature of a mixture of the processing residues (A1) and the aqueous citric acid solution reaches a range of 55 to 65° C., stirring is continued for 5 more minutes. When the mixture of the processing residues (A1) and the aqueous citric acid solution is thus heated and stirred, the midgut gland expands and a thin midgut gland membrane is broken. As a result, the internal solution of the midgut gland containing cadmium in a liquid state is eluted and the cadmium contained in the internal solution of the midgut gland is liberated by citric acid. The soft bodies except the midgut gland remain as solid matters. The reason why the temperature of the mixture is set to a range of 55 to 65° C. is that a temperature lower than 55° C. does not make the midgut gland exploded easily while a temperature higher than 65° C. allows the midgut gland to be hardened by heat denaturation of protein, thereby hardly eluting the internal solution of the midgut gland containing cadmium.

Next, in a second process (A3), a mixture of the processing residues after the internal solution of the midgut gland has been eluted, i.e., solid matters such as the gonad, mantle, gill, heart, and kidney which are reused as fertilizers, and the eluted internal solution of the midgut gland containing cadmium is passed through a sieve to separate into solid matters and a liquid. Here, when the amount of citric acid is from 1.8 to 3.3% by weight relative to the total weight of the processing residues (A1) and the water, most of the cadmium contained in the internal solution of the midgut gland mixed in the solid matters is removed and the content is less than the acceptable standard value (i.e., 0.8 ppm per 1% nitrogen) according to the Fertilizer Control Law. Consequently, the solid matters separated by a sieve can be reused as organic fertilizers.

The changes effected by the amendment are shown below:

Next, in a second process (A3), a mixture of the processing residues after the internal solution of the midgut gland has been eluted, i.e., solid matters such as the gonad, mantle, gill, heart, and kidney which are reused as fertilizers, and the eluted internal solution of the midgut gland containing cadmium is passed through a sieve to separate into solid matters and a liquid. Here, when the amount of citric acid is from 1.8 to 3.3% by weight relative to the total weight of the processing residues (A1) and the water, most of the cadmium contained in the internal solution of the midgut gland mixed in the solid matters is removed and the content is less than the acceptable standard value (i.e., 0.8 ppm per 1% nitrogen) according to the Fertilizer Control Law. Consequently, the solid matters separated by a sieve can be reused as organic fertilizers.

When the amount of citric acid is a small value, for example, 0.9 to 1.7% by weight relative to the total weight of the processing residues (A1) and the water, the cadmium contained in the internal solution of the midgut gland mixed in the solid matters may not necessarily satisfy the acceptable standard value according to the Fertilizer Control Law. In this case, as shown in FIG. 1(B), the separated solid matters are washed with water to remove the cadmium remaining in the solid matters. Specifically, in a third process (B1), 0.9- to 2.2 times weight of water is added to the solid matters separated by the sieve in the second process and the mixture of them is heated to 55 to 65° C. while stirring. The heating and stirring are continued for 10 more minutes. The cadmium remaining in the solid matters are washed off by the washing and removing process.

Here, the amount of water to be added to the solid matters may be further increased. In order to reduce the amount of the cleaning liquid containing cadmium, it is desirable that the amount is as small as possible. An amount of water that can clean and remove the cadmium effectively is from 0.9 to 2.2 times weight of those of the solid matters.

Subsequently, in a fourth process (B2), a mixture of the solid matters after washing off the remaining cadmium and the free cadmium eluted is passed through a sieve to separate into solid matters and a liquid. When the content of cadmium in the solid matters obtained in the fourth process needs to be reduced, the third and fourth processes are repeated as shown in (C) of FIG. 1.

Subsequently, another method of producing organic fertilizer and organic feed of the present invention will be described with reference to FIG. 2. In the production method, water is added to raw processing residues containing the midgut gland and the mixture is stirred and heated. Thus, the midgut gland is expanded and the thin midgut gland membrane is broken, and the internal solution of the midgut gland containing cadmium is eluted. Subsequently, the mixed internal solution of the midgut gland containing cadmium is flushed from the solid matters which has been filtrated and removed by the sieve by washing with warm water. Finally, the cadmium contained in the internal solution of the midgut gland remaining in the solid matters is liberated and washed out with an aqueous citric or acetic acid solution. Hereinafter, the process will be specifically described.

Figure 2:
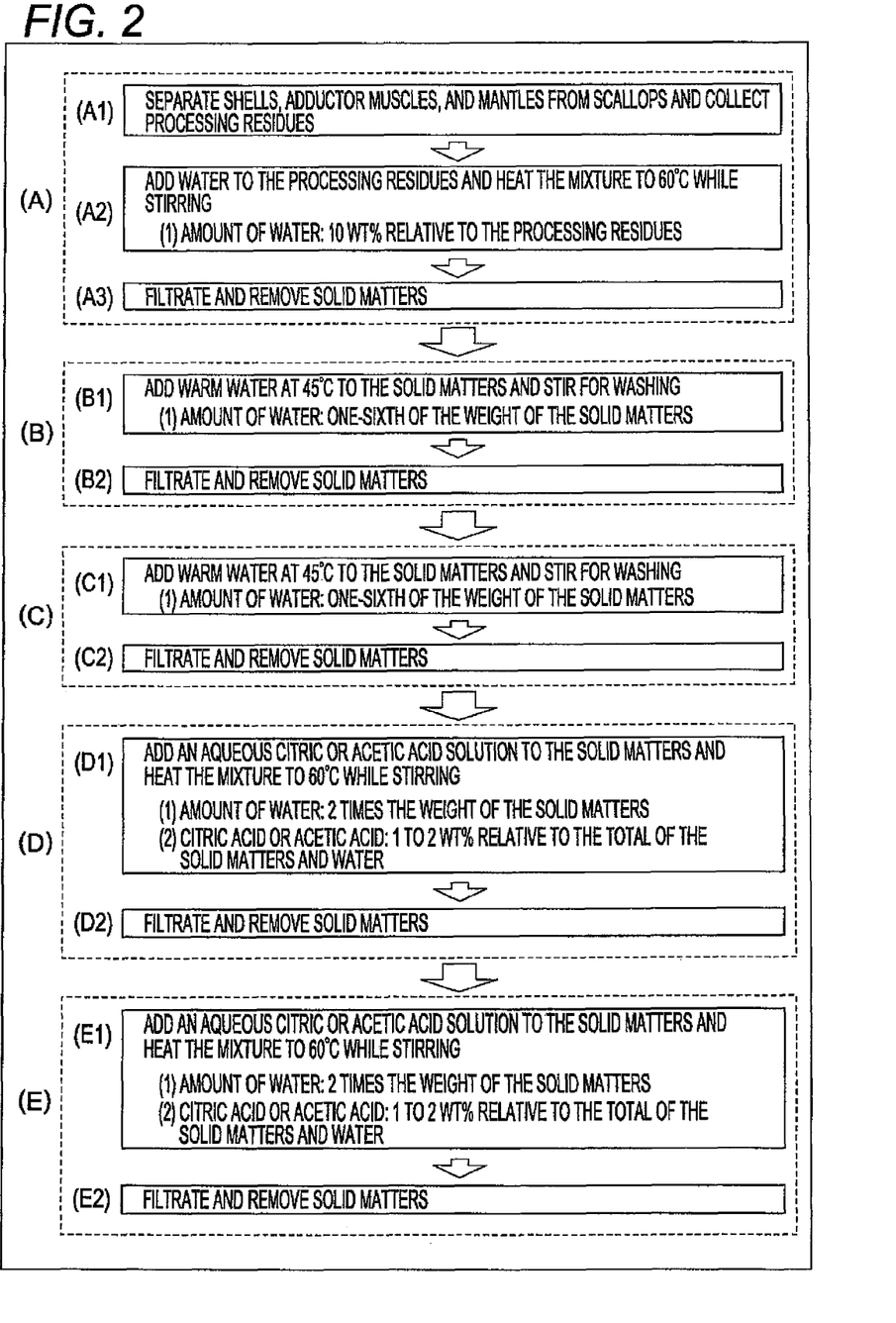
FIG. 2 is a block diagram showing another process of producing an organic fertilizer.

In the first process (A2) shown in FIG. 2(A), water is added to the processing residues containing the midgut gland of scallop (A1) and the mixture of them is heated to 55 to 65° C. Thus, the thin midgut gland membrane is broken and the internal solution of the midgut gland containing cadmium is eluted to obtain a first mixture containing solid matters and the internal solution of the midgut gland thus eluted. The weight of water to be added to the processing residues containing the midgut gland of scallop is at least 9% by weight relative to the weight of the processing residues. The weight of water may be increased. However, in order to reduce the amount of the cleaning water containing cadmium as described above, the weight of water that can remove the internal solution of the midgut gland effectively is from 9 to 20% by weight relative to the processing residues (A1). Subsequently, in a second process (A3), a mixture of the solid matters in the processing residues after the internal solution of the midgut gland is eluted and the internal solution of the midgut gland is passed through a sieve to separate into solid matters and a liquid.

Since the internal solution of the midgut gland containing the eluted cadmium is mixed in the separated solid matters, it is washed with warm water twice as shown in FIGS. 2(B) and (C). That is, in the following third process (B1), warm water at 40 to 50° C. is added to the solid matters separated in the second process (A3), the internal solution of the midgut gland remaining in the solid matters is washed with the warm water to remove, and a second mixture containing the solid matters from which the internal solution of the midgut gland is removed by washing and the internal solution of the midgut gland removed by the washing process is obtained. In a fourth process (B2) following the above process, the solid matters are separated from the second mixture. As fifth processes (C1) and (C2), the third process (B1) and the fourth process (B2) are repeated once again.

Here, the amount of the warm water to be added in the third process (B1) and the fifth process (C) is at least one-sixth weight of the solid matters separated in the previous process. The amount of the warm water may be increased. In order to reduce the amount of the cleaning liquid containing cadmium, it is desired that the amount is one-sixth to one-third weight.

Subsequently, in the sixth process (D1) shown in FIG. 2 (D), either the aqueous citric or acetic acid solutions is added to the solid matters separated in the final process (C2) of the fifth process and the mixture of them is heated at 55 to 65° C. while stirring. The cadmium contained in the internal solution of the midgut gland remaining in the solid matters is liberated and washed off to remove. Thus, a third mixture containing the solid matters in which the cadmium is washed off to remove and the cadmium removed by the washing process is obtained. In the seventh process (D2), the solid matters are separated from the third mixed solution.

Here, in the sixth process (D1), the amount of the aqueous citric or acetic acid solution which is added to the separated solid matters is form 1.8- to 2.2 times weight relative to the solid matters in order to reduce the amount of the cleaning liquid and wash effectively. The concentration of the aqueous citric or acetic acid solution may be from 0.9 to 2.2% weight relative to the total weight of the solid matters and water to be added.

The content of cadmium in the solid matters finally separated is less than the acceptable standard value (i.e., 0.8 ppm per 1% nitrogen) according to the Fertilizer Control Law by the first process (A2) to the seventh process (D2) as described in FIG. 2, which enables the solid matters to be reused as organic fertilizers. Hence, the content of cadmium in the solid matters may not satisfy an acceptable value for feed, i.e., a standard (the content of cadmium is 2.5 ppm or less in a dried product).

When reusing as an organic feed, the concentration of organic acid to be added in the sixth process (D1) may be from 0.9 to 2.2% by weight similarly as described above in the case of using citric acid. The concentration is set to a high value, for example, 1.8 to 2.2% by weight in the case of using acetic acid. As shown in FIG. 2(E), the washing with the citric or acetic acid solution having the concentration above and the separation of the solid matters, namely the sixth process (D1) and the seventh process (D2) of FIG. 2(D) are repeated once again (the eighth processes (E1) and (E2)).

EXAMPLE 1

Figure 3:
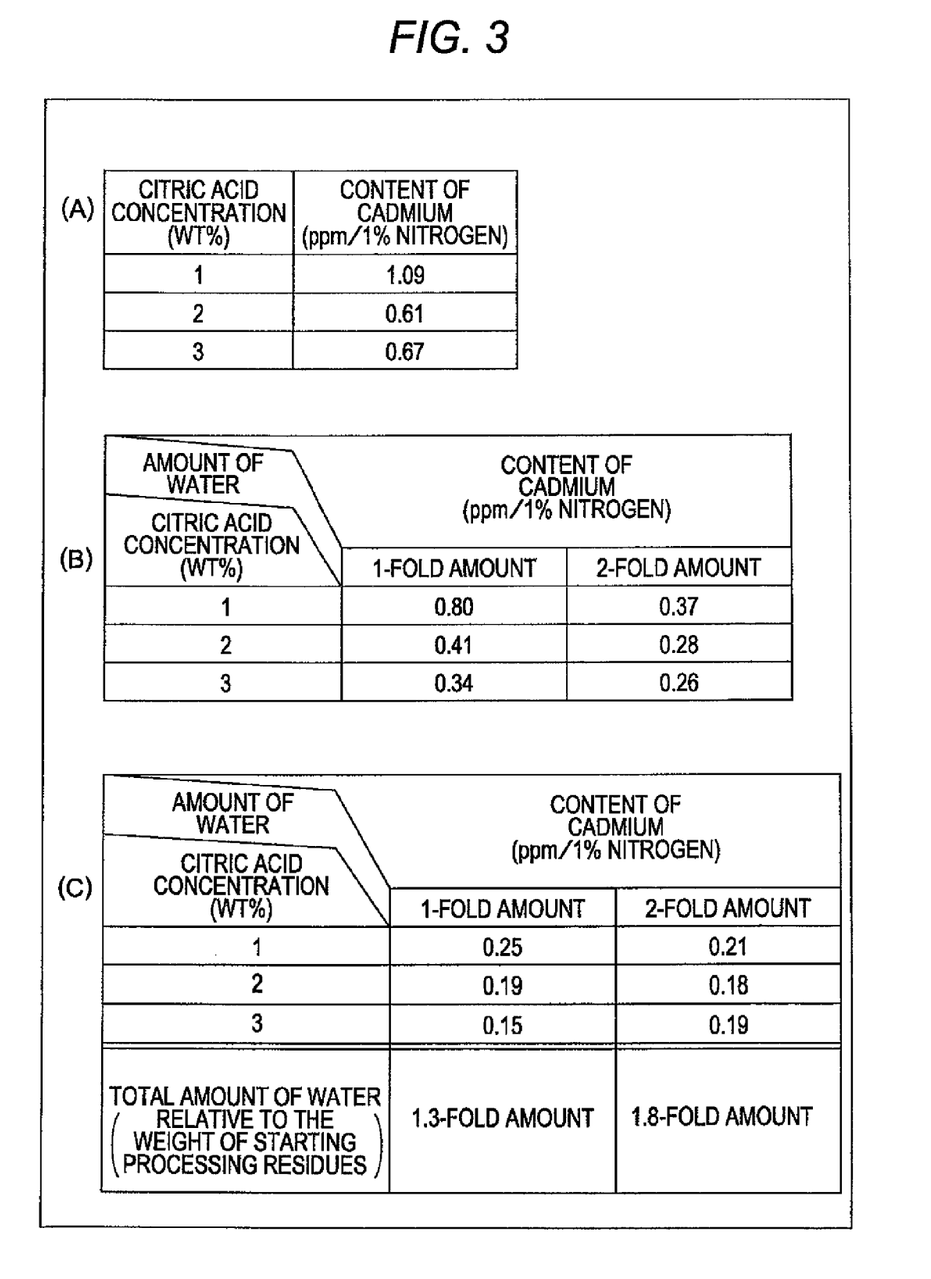
FIG. 3 is a table showing results of an effect confirmation test of the process of producing an organic fertilizer.

FIG. 3 shows the test results of examining the amount of the cadmium contained in the solid matters when an aqueous citric acid solution was first added to processing residues containing the midgut gland, the mixture of them was heated, and the separated solid matters were washed twice. In other words, 1.5 kg (10% by weight) of water and 1, 2 and 3% by weight of citric acid for industrial use relative to the total (16.5 kg) of the starting processing residues containing the midgut gland and water were added to 15 kg of the processing residues containing the midgut gland and the mixture of them was heated while stirring. After the central temperature of the mixture reached 60° C., the stirring and heating were continued for 5 more minutes. Subsequently, the solid liquid was separated by a stainless steel sieve to obtain the solid matters whose amount was one-fifth (3.3 kg) of the starting processing residues.

The cadmium content of the starting processing residues containing the midgut gland as a raw material was 6.73 mg/kg. However, it was confirmed that when the concentration of the aqueous citric acid solution was 2 and 3% by weight relative to the total weight of the solid matters and water, the content of cadmium in the solid matters obtained by the above processes was less than the standard value (i.e., 0.8 ppm per 1% nitrogen) according to the Fertilizer Control Law as shown in FIG. 3(A). When the concentration of the aqueous citric acid solution was 1% by weight relative to the total weight of the solid matters and water to be added, the cadmium content was 1.09 ppm/1% nitrogen, and thus it did not satisfy the standard value (i.e., 0.8 ppm/1% nitrogen) according to the Fertilizer Control Law.

Subsequently, only 1 and 2 times amounts of water relative to the solid matters were added to the solid matters and the mixture of them was heated and stirred until the temperature reached 60° C. The solid liquid was separated by the stainless steel sieve. The content of cadmium in the solid matters obtained by the above washing process was considerably reduced as shown in FIG. 3(B). It could be confirmed that when the concentration of the aqueous citric acid solution was 2% by weight relative to the total weight of the solid matters and water to be added, the cadmium content was less than the standard value according to the Fertilizer Control Law by washing with water in an amount equivalent to that of the solid matters. It could be confirmed that when the amount of water was twice as large as that of the solid matters, the content of cadmium was less than the standard value according to the Fertilizer Control Law even if the concentration of the aqueous citric acid solution was 1% by weight relative to the total weight of the solid matters and water to be added.

In order to examine an effect of increasing the number of times of washing, the washing and separation processes were repeated once again. It could be confirmed that the content of cadmium in the solid matters obtained by repeating the washing process was reduced as shown in FIG. 3(C) and the washing with the aqueous citric acid solution of which amount was equivalent to that of the solid matters where concentration of the solution was 1% by weight relative to the total weight of the solid matters and water to be added allowed the content of cadmium to be less than the standard value according to the Fertilizer Control Law.

The content of cadmium in a scallop varies depending on the seasons and the effect of separating cadmium changes according to conditions such as the processing amount. However, in the confirmation tests, it could be confirmed that when a process of heat-washing with an aqueous citric acid solution of which weight was one-tenth of that of the processing residues containing the midgut gland and concentration of it was 2% by weight relative to the total weight of the processing residues and water to be added, and then washing with only water in an amount equivalent to that of the separated solid matters was repeated 2 to 3 times, the content of cadmium was less than the standard value according to the Fertilizer Control Law. As shown in the lowest column of FIG. 3(C), it could be confirmed that the amount of the cleaning liquid containing cadmium generated when the washing with the aqueous citric acid solution was performed once and when the washing only with warm water was performed twice was reduced to less than 2 times weight of the starting processing residues as raw samples.

EXAMPLE 2

Figure 4:
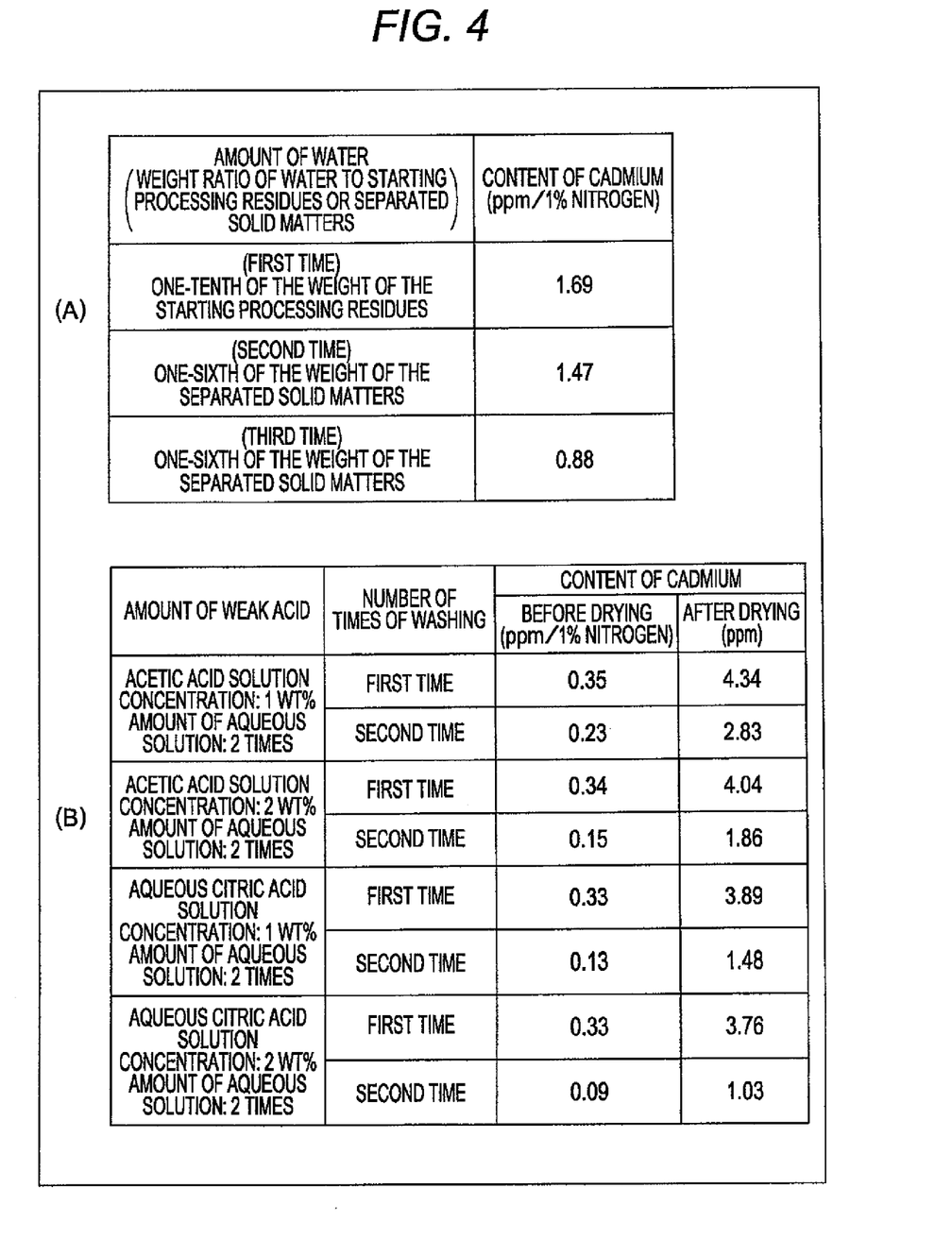
FIG. 4 is a table showing results of an effect confirmation test of another process of producing an organic feed and an organic fertilizer.

FIG. 4 shows the test results of the amount of cadmium contained in solid matters when only a small amount of water was added to processing residues containing the midgut gland and the mixture of them was heated, the process of separating the solid matters was repeated 3 times, and then the washing with a weak acidic aqueous solution of acetic acid or citric acid was repeated twice. In other words, water in an amount of one-tenth (100 kg) of the starting processing residues was added to 1000 kg of the starting processing residues containing the midgut gland and the mixture of them was heated to 60° C. while stirring. Further the heating and stirring were continued for 5 more minutes. Subsequently, 519 kg of the solid matters was separated by an industrial large-sized stainless steel sieve. The content of cadmium in the starting processing residues containing the midgut gland as raw samples was 3.91 ppm/1% nitrogen. However, the content of cadmium in the solid matters separated by the above process was reduced to 1.69 ppm/1% nitrogen as shown in the upper box of FIG. 4(A).

Hence, the content of cadmium in the solid matters separated by the above process did not satisfy the standard value (0.8 ppm/1% nitrogen or less) according to the Fertilizer Control Law. Thus, warm water at 45° C. was added in an amount of one-sixth weight of the solid matters separated in the previous process and the mixture of them was gently stirred for 1 minute. Subsequently, the solid matters were separated by the industrial large-sized stainless steel sieve. The process was repeated once again. The content of cadmium in the solid matters obtained by the second and third washing processes with hot water was reduced to 1.47 and 0.88 ppm per 1% nitrogen, respectively as shown in the middle box and the bottom box of FIG. 4(A).

Hence, the content of cadmium in the solid matters separated by the above process did not satisfy the standard value (0.8 ppm/1% nitrogen or less) according to the Fertilizer Control Law. Then, an aqueous acetic or citric acid solution of which amount was 2 times weight of the solid matters separated in the previous process and concentration of the solution was 1 or 2% by weight relative to the total amount of the solid matters and water was added and the mixture of them was heated until the central temperature reached 60° C. while stirring. Subsequently, the solid matters were separated by the industrial large-sized stainless steel sieve. The washing and separating of the separated solid matters with the same weak acidic aqueous solution were repeated once again.

The results of the content of cadmium in the solid matters obtained by washing with the weak acidic aqueous solution twice are shown in FIG. 4(B). In this regard, the content of cadmium was measured based on solid matters before drying under the condition of the standard value (0.8 ppm/1% nitrogen or less) according to the Fertilizer Control Law and solid matters as a dried product under the condition of the standard value for feed (2.5 ppm or less).

As shown in FIG. 4(B), it could be confirmed that when the solid matters were once washed with 2 times amount of the aqueous citric and acetic acid solutions relative to the weight of the solid matters where the aqueous solution had a concentration of 1% by weight relative to the total amount of the solid matters and water, the content of cadmium satisfied the standard value (i.e., 0.8 ppm per 1% nitrogen) according to the Fertilizer Control Law. It could be confirmed that when the solid matters were twice washed with the weak acidic aqueous solution without changing the concentration or once washed with the weak acidic aqueous solution by increasing the concentration to 2% by weight relative to the total amount of the solid matters and water, the content of cadmium could be further reduced in both cases.

In order to satisfy the standard value for feed, (i.e., the content of cadmium is 2.5 ppm or less in a dried product), it could be confirmed that when 2 times weight of the aqueous acetic acid solution relative to the solid matters was used, it was necessary to wash twice by setting the concentration to 2% by weight relative to the total amount of the solid matters and water. Alternatively, it could be confirmed that when 2 times weight of the aqueous citric acid solution relative to the solid matters was used, it was necessary to wash twice by setting the concentration to 1 or 2% by weight relative to the total amount of the solid matters and water.

Since cadmium can be easily removed from the processing residues of scallop by a simple means at low cost without separating the midgut gland, the present invention can be widely used in industries associated with scallop.

The invention claimed is:

1. A method of producing an organic fertilizer comprising:
a first process of adding an aqueous citric acid solution to processing residues containing a midgut gland of scallop and solid matters other than the midgut gland, heating the processing residues in the aqueous citric acid solution to 55 to 65° C., breaking a midgut gland membrane without breaking the solid matters other than the midgut gland to allow an internal solution of the midgut gland containing cadmium to be eluted, and preparing a mixture containing the solid matters other than the midgut gland in the processing residues and the eluted internal solution of the midgut gland; and
a second process of separating the solid matters in the processing residues from the mixture;
thus obtaining an organic fertilizer including the solid matters from the processing residues.

2. The method of producing an organic fertilizer according to claim 1, wherein the aqueous citric acid solution is obtained by adding a water by at least 9% weight relative to the processing residues and a citric acid by 1.8 to 3.3% weight relative to total weight of the processing residues and the water.

3. A method of producing an organic fertilizer comprising:
a first process of adding an aqueous citric acid solution to processing residues containing a midgut gland of scallop and solid matters other than the midgut gland, heating the processing residues in the aqueous citric acid solution to 55 to 65° C., breaking a midgut gland membrane without breaking the solid matters other than the midgut gland to allow an internal solution of the midgut gland containing cadmium to be eluted, and preparing a first mixture containing the solid matters other than the midgut gland in the processing residues and the eluted internal solution of the midgut gland; and
a second process of separating the solid matters in the processing residues from the first mixture;
a third process of adding a water to the separated solid matters in the processing residues and heating the separated solid matters in the processing residues in the water to 55 to 65° C., washing and removing the cadmium remaining in the solid matters in the processing residues with the water, and preparing a second mixture containing the solid matters in the processing residues from which the cadmium is washed and removed; and
a fourth process of separating the solid matters in the processing residues from the second mixture;
thus obtaining an organic fertilizer including the solid matters from the processing residues.

4. The method of producing an organic fertilizer according to claim 3, wherein the aqueous citric acid solution is obtained by adding a water by at least 9% weight relative to the processing residues and a citric acid by 0.9 to 3.3% weight relative to the total weight of the processing residues and the water, and
wherein the weight of water to be added to the separated solid matters in the processing residues in the third process is 0.9- to 2.2 times weight of the separated solid matters in the processing residues.

5. A method of producing an organic fertilizer comprising:
a first process of adding a water to processing residues containing a midgut gland of scallop and solid matters other than the midgut gland, heating the processing residues in the water to 55 to 65° C., breaking a midgut gland membrane without breaking the solid matters other than the midgut gland to allow an internal solution of the midgut gland containing cadmium to be eluted, and preparing a first mixture containing the solid matters in the processing residues and the eluted internal solution of the midgut gland;
a second process of separating the solid matters in the processing residues from the first mixture;
a third process of adding a warm water at 40 to 50° C. to the separated solid matters in the processing residues and washing and removing the internal solution of the midgut gland remaining in the solid matters in the processing residues with the warm water, and preparing a second mixture containing the solid matters in the processing residues from which the internal solution of the midgut gland is washed and removed and the internal solution of the midgut gland thus washed and removed;
a fourth process of separating the solid matters in the processing residues from the second mixture;
a fifth process of repeating the third and fourth processes once again;
a sixth process of adding either aqueous citric or acetic acid solutions to the separated solid matters in the processing residues at a completion of the fifth process and heating the separated solid matters in the processing residues in the aqueous citric or acetic acid solutions to 55 to 65° C., liberating cadmium contained in the internal solution of the midgut gland remaining in the solid matters in the processing residues and washing and removing the liberated cadmium, and preparing a third mixture containing solid matters in the processing residues from which the cadmium is washed and removed and the cadmium thus washed and removed; and
a seventh process of separating the solid matters in the processing residues from the third mixture;
thus obtaining an organic fertilizer including the solid matters from the processing residues.

6. The method of producing an organic fertilizer according to claim 5, wherein the weight of water to be added to the processing residues containing the midgut gland of scallop and the solid matters other than the midgut gland in the first process is at least 9% weight relative to the processing residues,
wherein the weight of warm water to be added to the solid matters in the processing residues in the third process is at least one-sixth weight of processing residues,
wherein the weight of either aqueous citric or acetic acid solutions to be added to the solid matters in the processing residues in the sixth process is 1.8 to 2.2 times weight of the solid matters in the processing residues, and wherein the concentration of citric acid or acetic acid in the aqueous solution is from 0.9 to 2.2% weight relative to the total weight of the solid matters in the processing residues and water.

7. A method of producing an organic feed comprising:

a first process of adding a water to processing residues containing a midgut gland of scallop and solid matters other than the midgut gland, heating the processing residues in the water to 55 to 65° C., breaking a midgut gland membrane without breaking the solid matters other than the midgut gland to allow an internal solution of the midgut gland containing cadmium to be eluted, and preparing a first mixture containing the solid matters in the processing residues and the eluted internal solution of the midgut gland;

a second process of separating the solid matters in the processing residues from the first mixture;

a third process of adding a warm water at 40 to 50° C. to the separated solid matters in the processing residues and washing and removing the internal solution of the midgut gland remaining in the solid matters in the processing residues with the warm water, and preparing a second mixture containing the solid matters in the processing residues from which the internal solution of the midgut gland is washed and removed and the internal solution of the midgut gland thus washed and removed; and a fourth process of separating the solid matters in the processing residues from the second mixture;

a fifth process of repeating the third and fourth processes once again;

a sixth process of adding either aqueous citric or acetic acid solutions to the separated solid matters in the processing residues at a completion of the fifth process and heating the separated solid matters in the processing residues in the aqueous citric or acetic acid solutions to 55 to 65° C., liberating cadmium contained in the internal solution of the midgut gland remaining in the solid matters in the processing residues and washing and removing the liberated cadmium, and preparing a third mixture containing the solid matters in the processing residues from which the cadmium is washed and removed and the cadmium thus washed and removed, a seventh process of separating the solid matters in the processing residues from the third mixture; and an eighth process of repeating the sixth and seventh processes once again;

thus obtaining an organic feed including the solid matters from the processing residues.

8. The method of producing an organic feed according to claim 7, wherein the weight of water to be added to the processing residues containing the midgut gland of scallop and the solid matters other than the midgut gland in the first process is at least 9% weight relative to the processing residues, wherein the weight of warm water to be added to the solid matters in the processing residues in the third process is at least one-sixth weight of the processing residues, wherein the weight of either aqueous citric or acetic acid solutions to be added to the solid matters in the processing residues in the sixth process is 1.8 to 2.2 times weight of the solid matters in the processing residues, wherein the concentration of aqueous citric acid solution to be added to the solid matters in the processing residues in the sixth process is 0.9 to 2.2% weight relative to the total weight of the solid matters in the processing residues and the water, and wherein the concentration of aqueous acetic acid solution to be added to the solid matters in the processing residues in the sixth process is 1.8 to 2.2% weight relative to the total weight of the solid matters in the processing residues and the water.

* * * * *